US006554158B2

(12) United States Patent
Kapiloff et al.

(10) Patent No.: US 6,554,158 B2
(45) Date of Patent: Apr. 29, 2003

(54) APPARATUS FOR DISPENSING ROLLED SHEET MATERIAL

(75) Inventors: David Wayne Kapiloff, Gainesville, GA (US); Adrian John Trevisan, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 114 days.

(21) Appl. No.: 09/773,232

(22) Filed: Jan. 31, 2001

(65) Prior Publication Data

US 2001/0032858 A1 Oct. 25, 2001

Related U.S. Application Data

(60) Provisional application No. 60/180,460, filed on Feb. 4, 2000.

(51) Int. Cl.[7] .......... B65G 59/00

(52) U.S. Cl. .......... 221/277; 242/564.1

(58) Field of Search .......... 221/30, 45, 277; 242/564, 564.1, 564.2, 564.3, 595.1; 226/129

(56) References Cited

U.S. PATENT DOCUMENTS

| | | | | |
|---|---|---|---|---|
| 2,308,840 A | | 1/1943 | Vaughn et al. | |
| 2,726,823 A | | 12/1955 | Jespersen | |
| 3,288,323 A | | 11/1966 | Craven, Jr. | |
| 4,141,516 A | * | 2/1979 | Olson | 226/129 |
| 4,307,639 A | * | 12/1981 | DeLuca | 226/91 |
| 4,756,485 A | | 7/1988 | Bastian et al. | |
| 4,974,783 A | | 12/1990 | Campbell | |
| 5,000,393 A | | 3/1991 | Madsen | |
| 5,192,044 A | | 3/1993 | Baskin | |
| 5,370,336 A | | 12/1994 | Whittington | |
| 5,836,862 A | | 11/1998 | Granger | |
| 5,937,718 A | | 8/1999 | Granger | |
| 5,979,284 A | | 11/1999 | Granger | |
| 6,006,642 A | | 12/1999 | Granger | |
| 6,027,002 A | | 2/2000 | Granger | |
| 6,092,451 A | | 7/2000 | Granger | |

* cited by examiner

*Primary Examiner*—Kenneth W. Noland
(74) *Attorney, Agent, or Firm*—Dority & Manning, P.A.

(57) ABSTRACT

An apparatus for dispensing rolled sheet materials from a roll. The apparatus includes a roll of sheet material and a feed mechanism for incrementally feeding lengths of sheet material from the roll to a dispensing position. The feed mechanism includes a user manipulable means for engagement by the user and a drive roller operably connected to the user manipulable means. The drive roller is maintained in continuous contact with the outer circumference of the roll. Upon operation of the user manipulable means by the user, the drive roller frictionally engages and drives the roll rotationally about the axis of the roll. This causes the incremental feeding of the sheet material by unwinding the sheet material from the roll.

24 Claims, 6 Drawing Sheets

APPARATUS FOR DISPENSING ROLLED SHEET MATERIAL

This application claims the benefit of Provisional Application No. 60/180,460 filed Feb. 4, 2000.

FIELD OF THE INVENTION

The present invention relates to an apparatus for dispensing sheet material from rolls of sheet material.

BACKGROUND OF THE INVENTION

It is desirable to provide a sufficient quantity of sheet materials to minimize the frequency of replacing spent rolls. Dispensers capable of storing and dispensing sheet materials from oversize rolls can be effectively used to reduce the frequency of replacing spent rolls. Reducing the frequency of the incidence of encountering spent rolls can be extremely important in high-traffic situations such as, for example, public and institutional washroom facilities.

In the past, dispensers have been designed to store and dispense both metered and unmetered quantities of a sheet material from an oversize roll. However it was found that the weight of the oversize roll frequently caused problems. In some cases, as the sheet material was withdrawn from the roll, the inertia of the rotating heavy roll caused excess sheet material to unwind from the roll. In other cases, the sheet material would prematurely tear due to the inertia of initiating rotation of the heavy roll. The first problem resulted in significant wastage of sheet material whereas the second required frequent user or custodial access to the dispenser to reposition the sheet so that it would feed properly through the dispenser. Such contact between a user and a dispenser can be undesirable, especially in settings such as public rest rooms. Moreover, requiring a custodian to remedy the situation negates some of the reasons to use an oversize roll, that is, to reduce the frequency that a user encounters a spent or inoperative roll as well as to minimize time spent checking and changing rolls.

Generally speaking, it was thought that the disadvantages of using oversize rolls outweighed the advantages. The alternative of using a multi-roll dispenser offered a lot of the same advantages but did not present the same disadvantages as an oversize roll. As a result, industry has generally moved in the direction of using multi-roll dispensers.

Accordingly, there is a need for a simple, inexpensive apparatus for dispensing sheet material from oversize rolls of sheet material which overcomes the negative effects of rotational inertia associated with such a heavy article.

SUMMARY OF THE INVENTION

The problems described above are addressed by the present invention which is an apparatus for dispensing sheet material from oversize rolls of sheet material. (However, the apparatus would work equally as well with standard sized rolls.)

Generally speaking, the apparatus includes a drive roller in contact with the circumference of the roll; a feed mechanism; and preferably a housing. The drive roller is in continuous contact with the outer surface or circumference of the roll of sheet material. The roll itself is free to rotate about its axis. Upon operation of the feed mechanism by a user, the drive roller frictionally engages and drives the roll rotationally. This results in the sheet material unwinding from the roll and dispensing through the opening in the housing.

In one embodiment of the present invention, the drive roller may move with respect to the roll of sheet material so that as the sheet material is unwound from the roll, the drive roller moves toward the axis of the roll. This may be accomplished by locating the drive roller at some fixed distance from the feed mechanism. As the roll decreases in circumference, the movement of the drive roller traces an imaginary arc about an axis located at a point on the feed mechanism. The drive roller's position along this arc is at the same scalar distance from the axis at any moment in time. Since the drive roller is moving arcuately, it can maintain continuous contact with the roll of sheet material. The arrangement described can be created by the use of a bar, rod, arm, or other similar linkage which fixes the scale distance between the drive roller and the point on the feed mechanism.

In an alternative embodiment, the scalar distance between the arbitrary axis on the feed mechanism and the drive roller may vary as well. In this embodiment, an idler such as a pulley, wheel, or gear may be used to keep tension on a belt or band connecting the feed mechanism to the drive roller. As the drive roller moves with respect to the feed mechanism, the idler would move accordingly to keep the belt under sufficient tension to enable the feed mechanism to activate the drive roller.

In either embodiment, it is desirable to maintain sufficient contact between the drive roller and the outer circumference of a continuously diminishing roll of sheet material in such a way that manipulation of the feed mechanism by a user imparts a force to the drive roller which in turn drives the roll via friction.

In yet another embodiment, the apparatus includes the housing, the drive roller in continuous contact with the circumference of the roll; the feed mechanism; and a pivotable arm adapted to receive a roll of sheet material. The drive roller should be in continuous contact with the outer circumference of the roll of sheet material. Desirably, this is accomplished by attaching the roll to the pivotable arm at a distal end of the arm. The roll is free to rotate about its axis. The other end of the pivotable arm is pinned or otherwise pivotally attached to the housing. The weight of the roll of sheet material causes the arm to pivot about its pinned connection until the outer circumference of the roll of sheet material contacts the drive roller. Upon operation of the feed mechanism by the user, the drive roller frictionally engages and drives the roll rotationally about its connection on the pivot arm. This results in the sheet material unwinding from the roll and dispensing through the opening in the housing.

In an aspect of the present invention, the feed mechanism may be a lever connected either directly or indirectly through gears, cables or other appropriate linkages to the drive roller. It is desirable that the lever be operable in only one direction through the use of a one-way clutch or transmission mechanism. Such a mechanism would allow a predetermined quantity of sheet materials to be dispensed by manipulation of the lever, but would not permit the winding or rewinding of sheet materials back onto the roll by manipulation of the lever in the opposing direction.

In another aspect of the invention, a biasing means may be utilized to maintain sufficient contact between the roll of sheet material and the drive roller. Alternatively and/or additionally, the coefficient of friction of the drive roller may be increased by an appropriate selection of materials, surface coatings, and/or surface configurations.

In still another aspect of the invention, a secondary drum may be utilized. The secondary drum may be placed between the drive roller and the opening in the housing so that as the sheet unwinds from the roll, it is made to pass over the secondary drum prior to its being dispensed. Desirably, at or near the end of the dispensing operation, the secondary drum perforates or cuts the sheet material to aid in dispensing.

In another aspect of the invention, the sheet material protruding from the dispenser can be torn from the roll, desirably with the aid of a cutting blade or tear surface located on or within the housing.

In an embodiment of the invention, the housing may be attached to a vertical surface, such as a wall, so that the axis of the roll is perpendicular to the mounting surface. It is desirable to mount the apparatus so that its back wall sits upon the mounting surface. This orientation has the advantage that it minimizes the intrusion of the dispenser into the usable space of the room while maximizing use of wall space which is normally wasted. Alternatively and/or additionally the dispenser may be partially or fully recessed into an opening in the wall.

It is contemplated that turning means can be used to redirect the sheet material as it comes off of the roll so as to dispense the material in any preferred direction if this feature is desirable In an embodiment of the invention, the pivotable arm may be in a single or double beam configuration. That is, the pivotable arm could be a single arm, desirably located to the rear of the housing to enable easier installation of the roll onto the arm. An appropriate means such as a support bar suitable for maintaining the roll upon the arm would be desirable. The double beam variation includes a rearmost arm and a forwardmost arm. It is envisioned that the roll is placed and maintained between the two arms.

One embodiment does not require the use of an arm of any kind. In this variation, the axis of the roll is engaged with protruding posts, tabs, supports, extensions, or the like which extend into the core of the roll. These posts are slidingly mounted to an interior portion of the housing and allow the roll to slide toward the drive roller until the circumference of the roll comes to rest against the drive roller.

Other embodiments are envisioned. One such embodiment which can be adapted to include any of the features listed above provides a suitable location for accommodating a stub roll. The stub roll could be appropriately dispensed through the opening until the sheet product on the stub roll was completely exhausted at which time additional sheet product would be or would continue to be supplied from the oversize roll accordingly.

A viewing window can be placed in a visually accessible location in the housing to enable a user or custodian to assess the quantity of sheet material on the roll remaining to be dispensed.

According to the invention, the sheet material may be a fibrous cellulosic material. Desirably, the sheet material is paper. More desirably, the sheet material is paper tissue. The sheet material may be wound into a coreless roll. Desirably, the sheet material is wound on a core to form a roll.

It is envisioned that an ultra-high capacity system such as the one presently described would hold at least twice as much sheet material as alternatives currently available. As such, it is contemplated that the apparatus utilize rolls containing at least about 4000 linear feet of paper. For example, rolls containing 2000 through 10,000 linear feet or more may be used. The only limits placed on the size of the roll result from the practical concerns of storage and weight of unused rolls, and dispenser sizes. No physical limits exist with respect to operation of the apparatus concerning the size of the roll. Rolls as large or as small as desired can be utilized satisfactorily in the present apparatus.

To aid especially in the dispensing of particularly thin sheet materials, a set of small nip rolls could be placed between the drive roller and the dispenser opening. It would be desirable for this set of rolls to possess a low friction surface and be pressed together with a low nip force. It would be possible to drive these rolls through the drive roller via gearing, belts, bands, or the like. The surface speed of the rolls should be slightly faster than the surface speed of the drive roller. This would enable the nip rolls to pull the sheet at a slightly greater speed than the sheet is moving at its point of contact with the drive roller.

Since the nip rolls also have a low surface friction and only a slight force between them, the sheet would be constantly slipping in the nip. The advantage of this configuration is that the nip rolls would effectively place the sheet under mild tension which would be helpful in guiding a very light weight or pliable sheet from the drive roll to the discharge opening of the dispenser. It is important to note that these nip rolls could be incorporated into the invention for other purposes.

One of the many advantages of the present invention is that the forces necessary to cause the roll to turn are not transmitted through a discrete length of sheet material as it is unwound from the roll of sheet material. This feature overcomes a number of issues related to the tensile strength of the sheet material which effectively is the limiting factor with other designs on the market. By applying the rotational force to the outer circumference of the roll any rolled material could be unwound regardless of the tensile strength of the sheet, this includes but is not limited to bath tissue and paper towel rolls.

The present invention also overcomes the issue of breaking or stopping the inertia of a spinning roll. Other designs are typically based upon a roll supported on a simple free-spinning hub. Once rotation of this type of roll is started the roll tends to spin until frictional forces stop its motion. This type of uncontrolled free spinning can continue to unwind sheet material from the roll causing jamming of the dispensing mechanism. This new design on the other hand prevents the free-spinning effect by coupling the rotation of the roll of sheet material with the drive roller. The roll thus will turn only when the drive roller is made to rotate.

The present invention also contemplates a method of dispensing sheet material from rolls of sheet material.

The method includes the step of loading and retaining an oversize roll of sheet material into the housing or onto the pivotable arm if the apparatus contains an arm. The pinned portion of the arm allows the arm to pivot downward entirely by or alternatively assisted by gravity until the outer circumference of the roll contacts the drive roller.

Upon operation of the feed mechanism by a user, the drive roller rotates about its axis a predetermined distance. The friction between the drive roller and the outermost length of sheet material on the roll causes the roll to rotate about the axis of the roll on the arm causing the sheet to unwrap from the roll and be fed into a dispensing position. That is, the rotation of the drive roller causes the roll of paper to turn.

DETAILED DESCRIPTION

Figure 1:
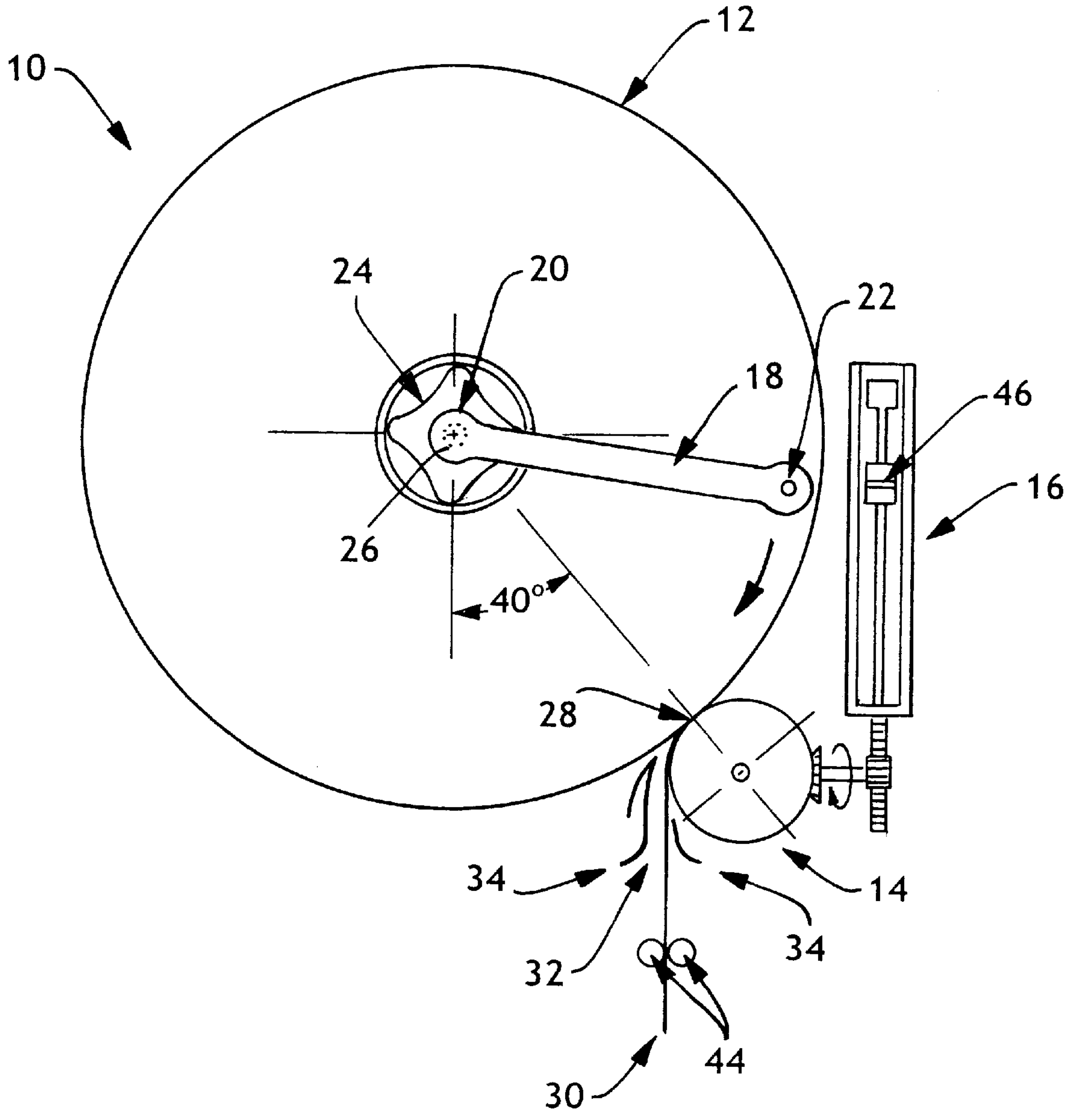
FIG. 1 is an illustration of an exemplary feed mechanism and drive roller portion of an apparatus for dispensing sheet material from a roll of sheet material.

Referring now to the drawings and in particular FIG. 1, there is shown at 10 a portion of an apparatus for dispensing sheet material from a roll 12 of sheet material. The apparatus includes a drive roller 14 operably connected to a feed mechanism 16, and an arm 18 adapted to hold the roll 12 at a distal end 20. The arm 18 is pivotally attached to the apparatus at a central point or axis 22. Generally speaking, the term "distal" is used to describe locations that are far from the central point or axis 22 of the arm 18. The arm 18 is free to rotate or pivot about the axis 22 until the outer circumference of the roll 12 comes to rest against the outer circumference of the drive roller 14.

In a desired embodiment, a cantilevered support bar 24 extends from the distal end of the arm 18. The support bar 24 is desirably perpendicular to the arm 18 and parallel to the axis 22. The support bar 24 engages the roll 12 at its axis 26 and allows for the unencumbered rotation of the roll about the axis 26.

In an embodiment of the invention, the support bar 24 may be configured so that it is non-movingly attached to the arm 18. In this configuration, the roll 12 would rotate with respect to the support bar 24. In another embodiment, the support bar may be configured so that it is rotationally attached to the arm 18 allowing the roll 12 to remain stationary with respect to the support bar 24. In this configuration, the support bar 24 and roll 12 act as if they are coupled and rotate together with respect to the arm 18.

In general, rotation of the roll 12 and the subsequent unwinding of the sheet material from the roll occurs through friction between the surface of the drive roller 14 and the surface of the roll 12 depicted at point 28. In one desired embodiment, the friction between the two components is due solely to the effects of gravity. More specifically, what is meant by the phrase "the effects of gravity" refers to an apparatus that relies on gravity as manifested in the weight of a particular component to provide some action substantially free from the aid of motors, springs or like sources to generate a force. However, in alternative embodiments, motors, springs or like sources are contemplated to be used and would create forces additive to the effects of gravity alone.

As the drive roller urges the roll to move, a leading edge 30 of the sheet material wrapped on the roll begins to unwind from the roll and is led to a dispensing position. To overcome the sheet material's natural tendency to remain wrapped around the roll 12, the weight of the roll or the use of additional biasing means should desirably provide sufficient contact force between the drive roller and the roll 12 at point 28 to cause the roll itself to deform slightly at the point of contact 28 with the drive roller 14. This deformation can be used advantageously to aid in unwrapping the sheet material from the roll. The slight radial deformation of the roll at the point of contact 28 causes the leading edge of the sheet material to pull away from the surface of the roll toward the surface of the drive roller after the leading edge contacts and clears the drive roller.

Additionally, to assist in unwinding the sheet material from the roll 12, the coefficient of friction of the drive roller 14 could be increased. This could be accomplished by, among other things, appropriate selection of materials, specific surface configurations, and additionally or alternatively appropriate surface coatings. The material used may be a natural or synthetic rubber compound or other polymer. The entire drive roller may be made of such a material or a suitable material could be incorporated separately into the drive roller in the form of bands, rings, inserts or other similar configurations.

The drive roller 14 could also be wrapped with a sheet of abrasive material such as ordinary sandpaper. A similar abrasive substance could be impregnated into the drive roller or incorporated as a surface treatment. Configuration of the surface of the drive roller could also provide the desired result. For instance, the surface could be knurled or otherwise machined to increase the friction between the sheet material and the roller.

In sum, the effect sought by increasing the friction between the drive roller 14 and the roll of sheet material 12 is two-fold. One reason is to provide adequate friction to enable the drive roller to rotate the roll. Another reason is to increase the relative attraction of the sheet material for the drive roller rather than the roll, permitting the sheet material to unwind from the roll.

It is also desirable to prevent the sheet material from clinging to the drive roller beyond a certain point otherwise, the sheet material will continue to wrap around the drive roller jamming the apparatus. A number of options are available which overcome this attraction at the appropriate point in time and prevent the sheet material from wrapping around the drive roller. One possible solution envisioned could be to provide a path 32 or conduit made of walls 34 or baffles, one portion of which extends to a point in near contact with the outer circumference of the drive roller. As the sheet material begins to travel around the drive roller, the leading edge contacts this wall or baffle, dislodging the sheet material from the drive roller and leading it toward the dispensing position.

Figure 2:
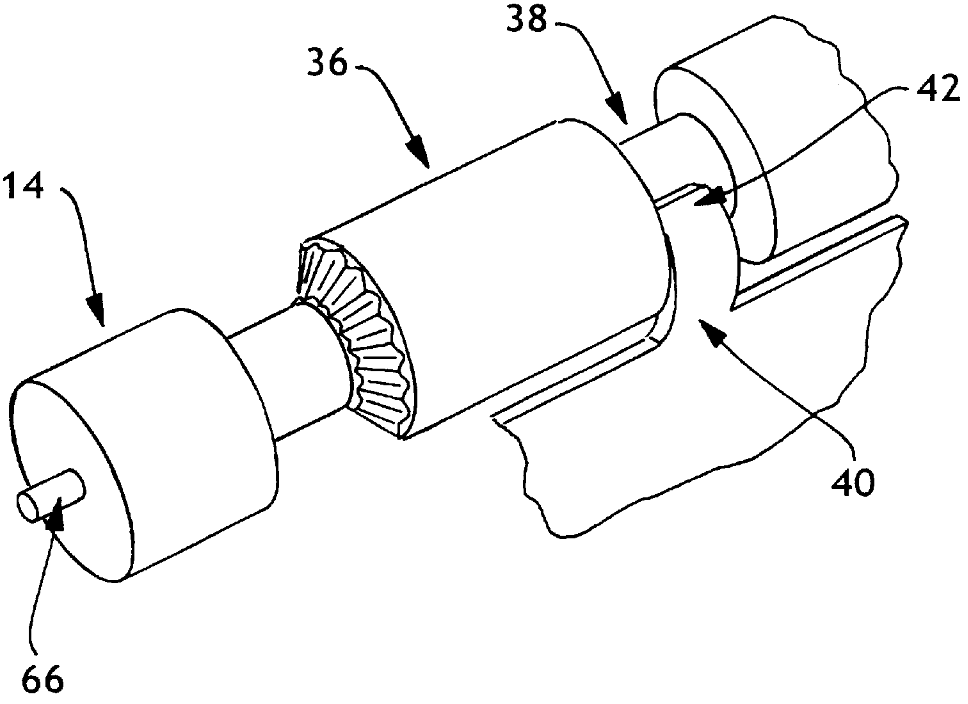
FIG. 2 is an illustration of an exemplary drive roller used in the FIG. 1 apparatus.

Another possibility depicted in FIG. 2 would be to groove the drive roller 14 so that it has more than one diameter. The larger diameter 36 forms the surface upon which the sheet material travels. The smaller diameter 38 could engage stationary fingers 40 affixed at a first end to, for example, the housing. The tip 42 or distal end of the fingers, would extend into the grooves. That is, the fingers would extend into the space between the larger and smaller diameters. When the sheet material traveling around the roller surface contacts the fingers it becomes dislodged from the drive roller into the dispensing position.

Alternatively or additionally, a band, ring, belt or the like could be wrapped between the drive roller and another location. The sheet material would be prevented from wrapping around the drive roller once it contacted the band. This alternative may be especially desirable in the configuration shown in FIG. 1.

The FIG. 1 embodiment also includes a set of small nip rolls 44 along the dispensing path 32 after the drive roller 14 and prior to any dispenser opening. These nip rolls could assist in guiding the sheet material through the dispenser and would by their use encourage the sheet material to travel over the drive roller 14 without wrapping.

The feed mechanism 16 provides the force that turns the drive roller 14. In a desired embodiment, a user manipulable means 46 is attached to the feed mechanism and is utilized to dispense the sheet material. What is meant by the term "user manipulable means" refers to a mechanism that requires an action on the part of the user to initiate its functioning. User manipulable means may include, but is not limited to, levers, switches, buttons, cranks, triggers, turnscrews, handles, arms, and pedals, any of which can be hand or foot activated.

The feed mechanism 16 may be any component which will transmit energy from the user manipulable means 46 to the drive roller. Examples of useful feed mechanisms include gears, linkages, and/or cables. Activation of the user manipulable means imparts a force upon the drive roller 14 causing it to rotate. Rotation of the drive roller is transferred to the roll 12 by friction causing the sheet material to unwind from the roll into a dispensing position.

It is desirable that the user manipulable means be operable in only one direction through the use of a one-way clutch or transmission mechanism. Such a mechanism would allow a predetermined quantity of sheet materials to be dispensed by manipulation of the user manipulable means, but would not permit the winding or rewinding of sheet materials back onto the roll by manipulation of the user manipulable means in the opposing direction.

One form of a desirable feed mechanism may be a direct drive the drive roller 14 by the user manipulable means 46. This could be done by a fixed connection or by engaging one component with the other. For instance, the user manipulable means could have at one end, an externally toothed spur gear which engages a mating internally toothed spur gear on the drive roller.

One possible embodiment would be to configure the end of the user manipulable means to have a tapered shaft having a square cross-sectional area. The tapered shaft would engage a mating female fitting which could be of square cross-section or some geometric multiple of a square cross-section. For instance, an octagonal fitting could be used. This would allow the shaft to engage the female fitting in multiple orientations.

The direct drive configuration would be desirable if the drive roller and the user manipulable means were coaxially aligned. However, a similar configuration could also be used if the axes were coplanar by substituting the internal spur gear for a second externally toothed spur gear.

Another desirable feed mechanism as depicted in FIGS. 1 and 2, which would enable the drive roller and the user manipulable means to be placed perpendicular to one another is to utilize bevel gears. It is envisioned that one end of the drive roller 14 could be fitted with a bevel gear 48 which mates with a corresponding bevel gear 50 on the end of the user manipulable means. However, where space is at a premium, the drive roller could be configured so as to have the bevel gear machined into the diameter of the roller itself as best illustrated in FIG. 2.

Additional gear configurations are of course possible and are therefore considered to form a part of this invention. Depending on the circumstances, location of the dispenser, and needs of the specific environment in which the dispenser is placed, the feed mechanism can be oriented in any manner and can use any suitable mechanism which enables the transferal of force from the user manipulable means to the drive roller resulting in the dispensing of the sheet material.

One possible feature that could desirably be incorporated into the apparatus would be to utilize a quantity of the force introduced into the mechanism by the user to activate the feed mechanism to bias the drive roller 14 more firmly against the roll 12 thereby increasing friction and providing an assist to the dispensing operation itself.

Removal of a discrete portion of the sheet material from the roll 12 can be accomplished by any number of means. For instance, the roll itself can be rolled from a series of overlapping or laid end-to-end lengths of precut sheet material. Alternatively, the roll can be constructed from a continuous roll of sheet material having perforations for separating a discrete length from the roll. Another possibility is for the apparatus itself to provide means for parting a length of sheet material from the roll.

In a desired embodiment, as the sheet material is unwound from the roll, the user grasps the dispensed sheet material and severs it by pulling it against a tear bar. In a more desirable embodiment, the tear bar is v-shaped with a serrated edge along both inside legs of the "v". This permits a pulling action in either a right or a left direction to part the sheet material.

Figure 3:
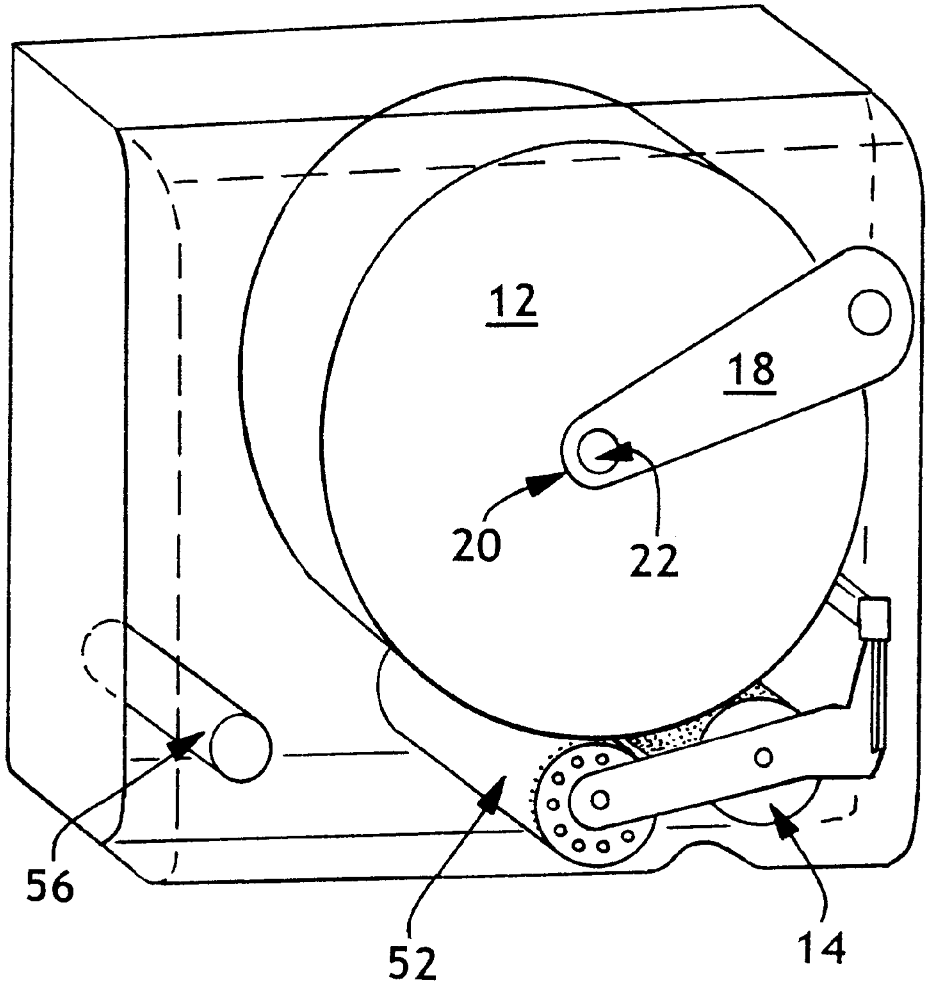
FIG. 3 is an illustration of the apparatus of FIG. 1 with additional components including an exemplary stub roll arm and an exemplary secondary drum.

Looking now to FIG. 3, other desirable embodiments may include a secondary drum 52. This drum 52 may be driven by the same mechanism that runs the drive roller. The purpose of the secondary drum would be to perforate or part the sheet material as the sheet material was unwound from the roll. As such, the drum would be provided with a series of perforating teeth or pins which when contacted with the sheet material would pierce the material leaving the desired perforation. If the sheet were to be cut, a knife and anvil arrangement could be utilized where desirably the knife was affixed or integrated into the secondary drum and the anvil portion was on the drive roller.

Depending upon the quantity of sheet material desired to be dispensed at each dispensing action, the drive roller and the secondary drum could be rotated at different rates. For instance, using the knife and anvil configuration as an example, approximately 12 inches of sheet material could be dispensed for each activation of the feed mechanism assuming that the secondary drum was 4 inches in diameter and that the drum rotated one revolution per every dispense. Once the drive roller ended its rotation, the anvil on the drive roller would contact the knife on the secondary drum and sever the sheet. During one revolution of the secondary drum, the drive roller could make multiple revolutions. Manipulating the gear ratios would allow smaller components to be used without affecting the size of the sheet to be dispensed.

Another possibility would be to eliminate contact between the drive roller and the secondary drum until the perforating or parting action were to occur. In fact, if this approach were desired, the secondary drum could be replaced with a non-rotational knife which engages an anvil and perforates or severs the sheet material.

Figure 4:
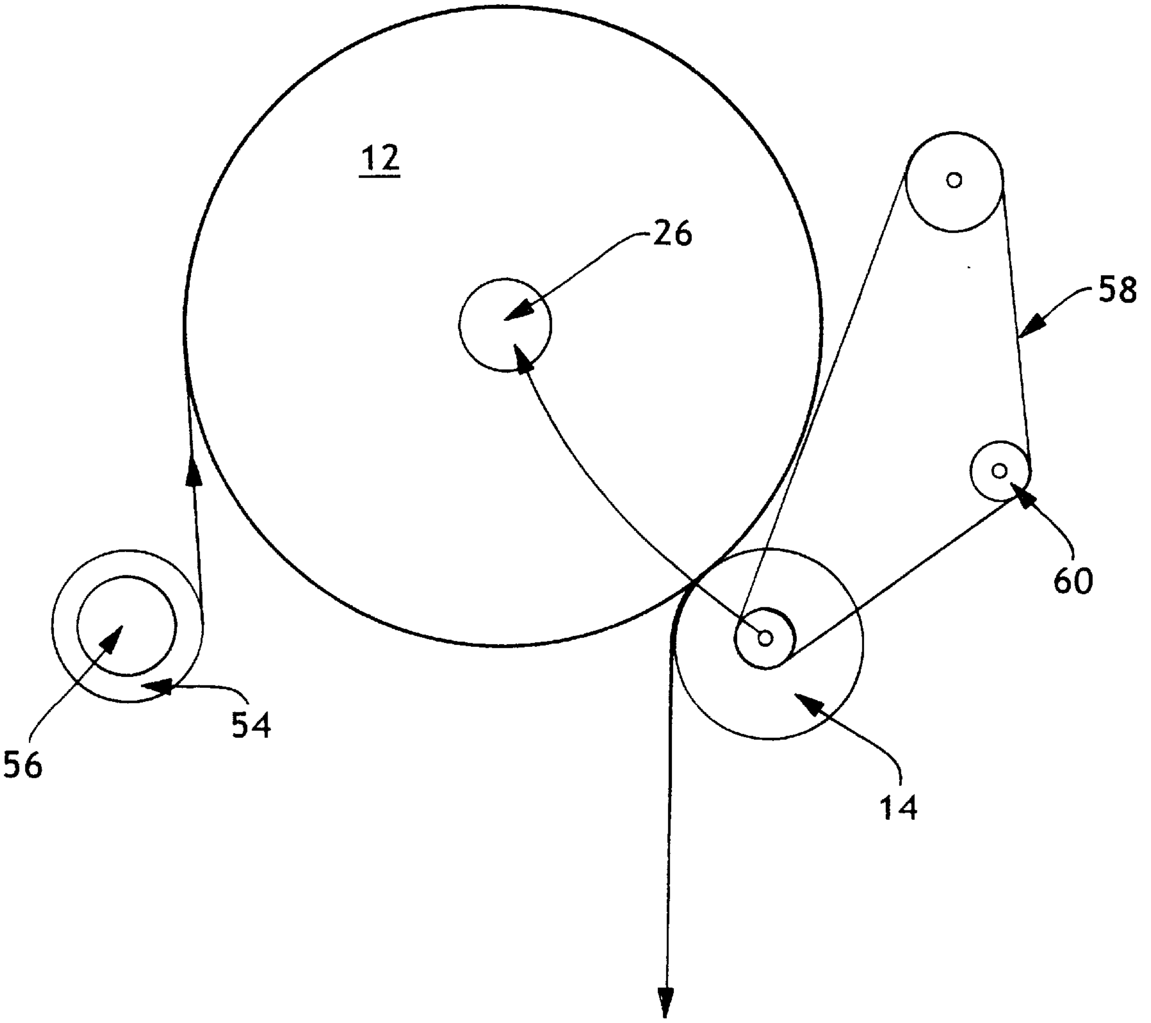
FIG. 4 is an illustration of an alternative exemplary feed mechanism and drive roller portion of an apparatus for dispensing sheet material from a roll of sheet material.

Another possible addition shown in FIG. 4 adds the capability to feed additional sheet material from a stub roll 54. It is envisioned that the stub roll 54 is placed on an arm 56 and the sheet material is double fed with the roll 12 until the stub roll is depleted.

Other versions of the device are possible as well. For instance, as depicted in FIG. 4, the drive roller 14 could be made to move with respect to the roll 12. In this configuration, a pivoting bar, rod, arm, or other similar linkage fixes the distance between the drive roller and the point on the feed mechanism but allows for the drive roller to move toward the axis of the roll 12 and maintain continuous contact with the roll.

Alternatively, a belt 58 could be stretched between the drive roller 14 and the feed mechanism 16. An idler of some kind, such as a pulley or wheel 60 could be utilized to keep the desired tension upon the belt to ensure that the drive roller is driven by the feed mechanism. Yet another desirable embodiment biases the axes of either the drive roller or the roll one toward the other in a straight line. This could be accomplished by the use of a tensioning spring connecting each of the axes.

Another desirable configuration contemplates the elimination of the arm 18 altogether. In this embodiment, the axis of the roll is engaged with protruding posts, tabs, supports, extensions, or the like which extend into the core of the roll. These posts are slidingly mounted to an interior portion of the housing and allow for the roll to slide linearly or arcuately toward the drive roller until the circumference of the roll comes to rest against the drive roller. This apparatus works otherwise works in the same manner as those variations described above.

Figure 5:
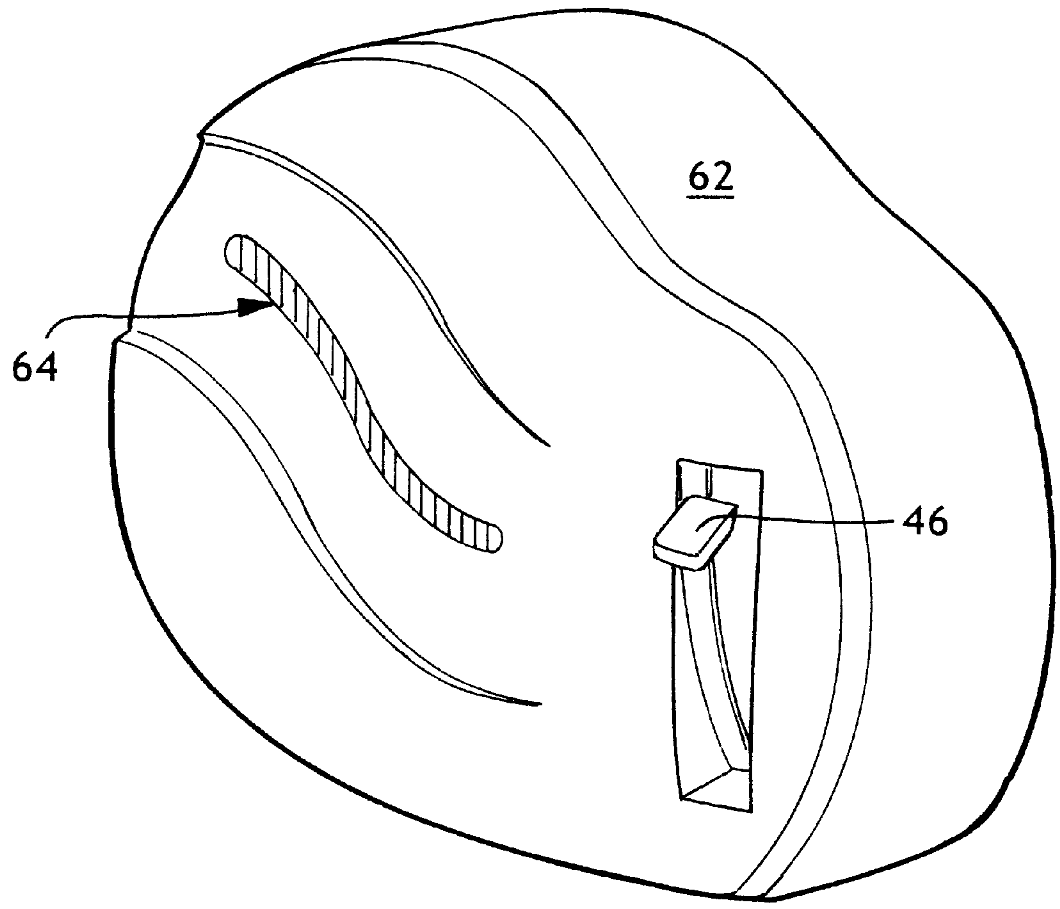
FIG. 5 is an illustration of an exemplary housing which could contain the FIG. 1 or FIG. 4 apparatus.

According to the invention, the apparatus for dispensing sheet material from rolls may include a housing 62. Generally speaking, the housing 62 may be composed of a front wall, a top wall, and side walls. The housing may contain or include a pivoting cover as well as latches, hinges, locks, brackets or the like that may be found in conventional dispenser designs. A viewing window 64 best illustrated on FIG. 5 may be placed in a visually accessible location in the housing to enable a user or custodian to assess the quantity of sheet material on the roll remaining to be dispensed. In one aspect of the invention, the axis 22 of the arm 18 is connected to an interior portion of the housing 62. Additionally, the drive roller 14 may also be rotatably attached to the housing by an axle 66 as shown in FIG. 2.

In an embodiment of the invention, the housing may be attached to a vertical surface, such as a wall, so that the axis 26 of the roll 12 is perpendicular to the mounting surface. It is desirable to mount the apparatus so that its back wall sits upon the mounting surface. This orientation has the advantage that it minimizes the intrusion of the dispenser into the usable space of the room while maximizing use of wall space which is normally wasted.

The dispensing apparatus may be manufactured from any suitable material. The entire apparatus may be made from one material or combinations of materials may be used. Exemplary materials include plastics and metals.

Figure 6:
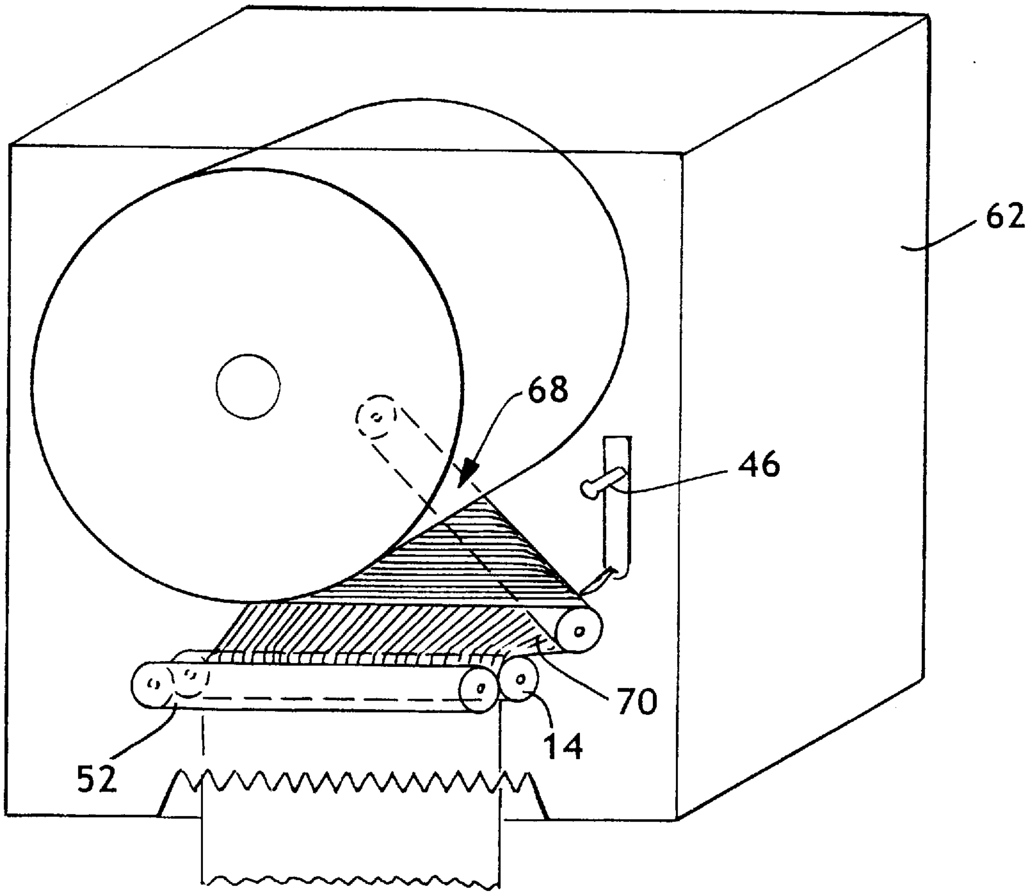
FIG. 6 is an illustration of yet another exemplary feed mechanism and drive roller portion of an apparatus for dispensing sheet material from a roll of sheet material, adding turning means to redirect the sheet material as it dispenses.

Turning means, as shown in FIG. 6 can be used to redirect the sheet material as it comes off of the roll so as to dispense the material in any preferred direction if this feature is desirable. One form of turning means envisioned would be to provide turning bars located between the roll and the dispenser opening. In one embodiment, two such bars 68 and 70 are contemplated, each bar offset from the other at an angle of 45 degrees. This allows the sheet material to be dispensed at a right angle from its unwinding orientation. That is, as the sheet material is unwrapped from the roll 12, it contacts the first bar 68 which redirects the sheet at an angle of 45 degrees from the tangent of the circumference of the roll 12. The sheet next contacts the second bar 70 which redirects the sheet an additional 45 degrees, for a total of 90 degrees. The bars 68, 70 serve primarily to redirect the sheet, so they should be made as frictionless as possible and need not rotate. Generally speaking, the dispensing apparatus may be used to sequentially dispense any flexible sheet material that can be wound on a roll and dispensed in individual portions. In many cases, the sheet material may be a fibrous cellulosic material such as, for example a nonwoven web of cellulosic fibers that has a structure of individual fibers which are interlaid, but not in an identifiable repeating manner. Such webs have been, in the past, formed by a variety of nonwoven manufacturing processes known to those skilled in the art such as, for example, air-forming, wet-forming and/or papermaking processes. Exemplary fibrous cellulosic materials include papers, paper tissues and the like. Such materials can be treated to impart desired properties utilizing processes such as, for example, calendering, hydraulic needling, hydraulic entangling and the like. Generally speaking, the cellulosic fibrous material may be prepared from cellulose fibers from natural sources such as woody and non-woody plants. The cellulose fibers may be modified by various treatments such as, for example, thermal, chemical and/or mechanical treatments. It is contemplated that reconstituted and/or synthetic cellulose fibers may be used and/or blended with other cellulose fibers of the fibrous cellulosic material.

Desirably, the sheet material is paper. More desirably, the sheet material is paper tissue. It is desirable for the sheet material to be wound on a hollow core to form a roll. However, the use of a hollow core roll is not required for successful operation of the present invention. The sheet material may be wound into a coreless roll. In fact, in an aspect of the invention, this is a desirable alternative.

In some applications it may be desirable to dispense particularly thin or flimsy papers. It would therefore be desirable in these cases to make use of the nip rolls 44 discussed above and depicted in FIG. 1. This set of small nip rolls 44 could be placed between the drive roller and the dispenser opening. It would be desirable for this set of rolls to possess a low friction surface and be pressed together with a low nip force. It would be possible to drive these rolls through the drive roller via gearing, belts, bands, or the like. The surface speed of the rolls 44 would preferably be slightly faster than the surface speed of the drive roller. This would enable the nip rolls to pull the sheet at a slightly greater speed than the sheet is moving at its point of contact with the drive roller. Since the nip rolls also have a low surface friction and only a slight force between them, the sheet would be constantly slipping in the nip. The advantage of this configuration is that the nip rolls would effectively place the sheet under mild tension which would be helpful in guiding a very light weight or pliable sheet from the drive roll to the discharge opening of the dispenser.

An embodiment especially suited for the use of coreless rolls would be to provide a double beam arm. Each beam of the arm in this embodiment would engage and preferably lock in position to one side of the roll at the axis of the roll.

In an embodiment of the invention, the dispenser may be configured to sequentially dispense bathroom tissue from an oversize roll wound about a core. Generally speaking, the term "oversize roll" is meant to include individual rolls of bathroom tissue exceeding the standard dimensions of about 3 to about 5 inches in width and about 3 to about 5 inches in diameter. This contemplated that the apparatus be capable of dispensing rolls containing about 4000 linear feet of paper. For example, rolls containing 2000 through 10,000 linear feet or more may be used. The only size limits result from the practical concerns of adequate storage facilities for unused rolls, the weight of and ease of personnel handling of the unused rolls especially during installation, and the available dispenser footprint and volume in the environment. No physical limits exist regarding operation of the apparatus with respect to the size of the roll. Rolls as large or as small as desired can be utilized satisfactorily in the present apparatus. Accordingly, embodiments of the dispensing apparatus may have dimensions suited to hold and store standard sized rolls of bathroom tissue.

The method of the present invention relates to the sequential dispensing of discrete lengths of sheet material from a roll of sheet material. The roll may have a core or may be coreless. The method is especially suitable for the dispensing of sheet material from an oversize roll. Generally speaking, the method includes the step of loading the roll of sheet material onto the support bar extending normal to a pivotable arm at a distal end of that arm. The weight of a full roll of sheet material on the support bar and arm urges the arm to pivot about a pivotable connection until the outer circumference of the roll of sheet material intimately contacts the drive roller. That is, an unbalanced condition is created by the weight of the roll of sheet material causing the arm to rotate under the influence of gravity until the roll of sheet material contacts the drive roller.

It is contemplated that the arm could be replaced by sliding joints which axially engage the roll of sheet material or the drive roller could be made to pivot toward a stationary but rotatable roll. The important point to note is that the outer circumference of the roll of sheet material maintains continuous contact with the drive roller.

The roll is depleted by unwinding sheet material from the roll. This is accomplished by manipulation of the feed mechanism by desirably, the user manipulable means. That is, a lever or other user manipulable means is provided which enables a user to activate the feed mechanism. The feed mechanism drives the drive roller rotationally. Friction between the drive roller and the outer surface of the roll of sheet material drives the roll of sheet material. The friction between the two components can be solely a function of gravity or may in addition include some other force biasing the two axially toward one another. One such possibility includes springs.

Reloading of the dispensing apparatus is accomplished by opening the housing or cover, disposing of the depleted core, if any, and loading a new roll on the support bar. In the event that the original roll is not fully depleted, accommodations for a partially depleted or stub roll are envisioned. Sheet material from the stub roll is wrapped around the outer circumference of the new roll so that a double feeding condition occurs until the stub roll is fully depleted. That is, during a portion of the dispensing operation, sheet material from each of the new roll and the stub roil are simultaneously dispensed in an overlapping configuration. In order to eliminate the possibility that a user will temporarily use the housing top support the weight of a full roll during the installation process, it is desirable that the cover to the housing be configured so that it does not function as a temporary support shelf while it is in an opened position. This may be accomplished by hinging the cover so that the cover is situated above or to the side of the support bar but not below it.

While the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus for dispensing rolled sheet materials from a roll, the apparatus comprising:
- a support bar extending through at least a portion of the center of the roll;
- a feed mechanism for incrementally feeding lengths of sheet material from the roll to a dispensing position, the feed mechanism comprising;
  - a user manipulable means for engagement by the user; and
  - a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position.

2. The apparatus of claim 1, wherein the axis of the roll of sheet material is oriented perpendicular to a mounting surface upon which the apparatus is situated.

3. The apparatus of claim 1, further comprising turning means to redirect the sheet material as it is dispensed from the roll.

4. The apparatus of claim 1, wherein the user manipulable means comprises a lever.

5. The apparatus of claim 1, further comprising a secondary drum.

6. An apparatus for dispensing rolled sheet materials from a roll, the apparatus comprising:
- a feed mechanism for incrementally feeding lengths of sheet material from the roll to a dispensing position, the feed mechanism comprising;
  - a user manipulable means for engagement by the user; and
  - a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; wherein the drive roller is biased toward the roll sheet material.

7. An apparatus for dispensing rolled sheet materials from a roll, the apparatus comprising:
- a feed mechanism for incrementally feeding lengths of sheet material from the roll to a dispensing position, the feed mechanism comprising;
  - a user manipulable means for engagement by the user; and
  - a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position;
  - wherein the roll of sheet material is biased toward the drive roller.

8. An apparatus for dispensing rolled sheet materials from a roll, the apparatus comprising:
- a feed mechanism for incrementally feeding lengths of sheet material from the roll to a dispensing position, the feed mechanism comprising;

a user manipulable means for engagement by the user;

a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; and a pivotable arm adapted to receive the roll of sheet material at a distal end, the arm having means to engage the central axis of the roll and enable rotation about the central axis.

9. The apparatus of claim 8 wherein the pivotable arm comprises two beams, wherein the roll is operably located between each beam.

10. An apparatus for dispensing rolled sheet materials from a roll, the apparatus comprising:

a feed mechanism for incrementally feeding lengths of sheet material from the roll to a dispensing position, the feed mechanism comprising;

a user manipulable means for engagement by the user;

a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; and at least one post for axially engaging the roll of sheet material, the post is slidably mounted to the apparatus and maintains the roll of sheet material in continuous contact with the drive roller.

11. An apparatus for dispensing rolled sheet materials from a roll, the apparatus comprising:

a feed mechanism for incrementally feeding lengths of sheet material from the roll to a dispensing position, the feed mechanism comprising;

a user manipulable means for engagement by the user; and a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; wherein the drive roller is coated with a material having a high coefficient of friction.

12. An apparatus for dispensing rolled sheet materials from a roll, the apparatus comprising:

a feed mechanism for incrementally feeding lengths of sheet material from the roll to a dispensing position, the feed mechanism comprising;

a user manipulable means for engagement by the user; and a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; wherein the feed mechanism further comprises a one-way clutch mechanism.

13. An apparatus for dispensing rolled sheet materials from a roll, the apparatus comprising:

a feed mechanism for incrementally feeding lengths of sheet material from the roll to a dispensing position, the feed mechanism comprising;

a user manipulable means for engagement by the user;

a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; and a secondary drum, wherein the secondary drum perforates the sheet material.

14. An apparatus for dispensing rolled sheet materials from a roll, the apparatus comprising:

a feed mechanism for incrementally feeding lengths of sheet material from the roll to a dispensing position, the feed mechanism comprising;

a user manipulable means for engagement by the user;

a drive roller operably connected to the user manipulable means, the drive roller in continuous contact with the outer circumference of the roll and upon operation of the user manipulable means by the user, the drive roller frictionally engages and drives the roll rotationally about the axis of the roll causing the incremental feeding of the lengths of sheet material to unwind from the roll into the dispensing position; and a secondary drum, wherein the secondary drum cuts the sheet material.

15. An apparatus for dispensing rolled sheet materials from a continuous roll, the apparatus comprising:

a housing having an opening;

a pivotable arm pinned at a first end to an interior portion of the housing and adapted to receive at a second end a roll of sheet material wound upon a hollow core, the arm having a portion that engages the hollow core and enables the roll to rotate about the core; and a user operable feed mechanism for incrementally feeding substantially uniform lengths of sheet material from the roll through the opening in the housing, comprising;

a lever extending from an interior portion to an exterior portion of the housing for engagement by the user; and a drive roller operably connected to the lever, the drive roller in continuous contact with the outer circumference of the roll and upon operation of the lever by the user, the drive roller frictionally engages and drives the roll rotationally about the core causing the incremental feeding of the substantially uniform length of sheet material to unwind from the roll and dispense through the opening in the housing.

16. The apparatus of claim 15, further comprising turning means to redirect the sheet material as it is dispensed from the roll.

17. The apparatus of claim 16 wherein the turning means comprise at least one turning bar.

18. The apparatus of claim 15, wherein the drive roller is selected from a material having a high coefficient of friction.

19. The apparatus of claim 15, wherein the pivotable arm comprises a double beam and the roll of sheet material is retained between each of the two beams.

20. The apparatus of claim 15, wherein the drive roller further comprises a one-way clutch mechanism.

21. An apparatus for dispensing discrete lengths of tissue from a continuous roll of tissue wound upon a core, the apparatus comprising:

a housing having an opening and a mounting surface;

a lever protruding from the housing accessible to a user;

a drive roller operably connected to the lever; and an arm for engaging the core of the roll of tissue having freedom of movement to maintain continuous contact between the outer circumference of the roll and the drive roller;

wherein manipulation of the lever by a user rotates the drive roller which in turn frictionally drives the roll to rotate about the core thereby unwrapping the tissue from the roll into a dispensing position at the opening of the housing.

22. The apparatus of claim 21, further comprising a means to sever the dispensed tissue from the continuous roll.

23. The apparatus of claim 21, wherein the core of the roll of tissue is oriented perpendicular to the mounting surface.

24. The apparatus of claim 21 adapted to receive a roll of tissue comprising at least about 4000 linear feet.

* * * * *